United States Patent [19]

Goldstein

[11] 4,193,454

[45] Mar. 18, 1980

[54] SUPER-ACTIVE CLAY CATALYST AND USE THEREOF

[75] Inventor: Theodore P. Goldstein, Yardley, Pa.

[73] Assignee: Mobil Oil Corporation, New York, N.Y.

[21] Appl. No.: 864,573

[22] Filed: Dec. 27, 1977

Related U.S. Application Data

[63] Continuation-in-part of Ser. No. 666,838, Mar. 15, 1976, Pat. No. 4,078,991.

[51] Int. Cl.$^2$ .................... C10G 13/04; C10G 23/02; E21B 43/22; E21B 43/24
[52] U.S. Cl. .................... 166/302; 166/260; 166/303; 166/305 R; 209/11 R; 208/39; 208/120
[58] Field of Search .................. 166/260, 303, 305 R, 166/11 R; 208/24, 27, 39, 120; 252/455 R

[56] References Cited

U.S. PATENT DOCUMENTS

| | | | |
|---|---|---|---|
| 2,423,674 | 7/1947 | Ågren | 166/303 X |
| 2,825,699 | 3/1958 | McEvoy et al. | 252/449 |
| 3,034,994 | 5/1962 | Braithwaite et al. | 252/445 R X |
| 3,072,187 | 1/1963 | Carr | 166/258 |
| 3,210,266 | 10/1965 | Michael et al. | 252/455 R X |
| 3,213,037 | 10/1965 | Hodgkiss | 252/455 R X |
| 3,382,924 | 5/1968 | Veley et al. | 166/305 R |
| 3,412,039 | 11/1968 | Miller | 252/455 R X |
| 3,621,913 | 11/1971 | Braden, Jr. | 166/272 |
| 3,956,183 | 5/1976 | Zuech | 252/455 R X |
| 4,060,480 | 11/1977 | Reed et al. | 208/120 X |

*Primary Examiner*—Stephen J. Novosad
*Assistant Examiner*—George A. Suchfield
*Attorney, Agent, or Firm*—C. A. Huggett; Henry L. Ehrlich; William J. Scherback

[57] ABSTRACT

This invention relates to a super-active clay catalyst material prepared by a special method for treating clay materials, said catalyst for use in catalytic conversion of organic materials such as, for example, hydrocarbon compounds, heavy crude petroleum stock and kerogen. Said special method comprises contacting a clay material, existing in the raw state as found in nature or synthesized, with a solution containing cations selected from the group consisting of transition metal ions, aluminum ions, hydrogen ions, ions of metals from Group IIB of the Periodic Table of Elements and a combination thereof with each other, said clay material having been maintained at a temperature not exceeding about 100° C. prior to and during the contacting with said solution, and thereafter heating said exchanged clay material to a temperature of at least about 50° C. but not exceeding about 250° C. in the presence of air and/or organic material which is to be catalytically converted. Further, this invention relates to in situ converting organic materials such as, for example, hydrocarbons, heavy crude petroleum stock and kerogen, by contact at low temperature, e.g. from about 50° C. to about 250° C., with said super-active clay material having been prepared in situ or transported thereto.

22 Claims, No Drawings

SUPER-ACTIVE CLAY CATALYST AND USE THEREOF

CROSS-REFERENCE TO RELATED APPLICATION

This is a continuation-in-part of application Ser. No. 666,838, filed Mar. 15, 1976, now U.S. Pat. No. 4,078,991.

BACKGROUND OF THE INVENTION

1. Field of the Invention

This invention relates to a super-active clay catalyst material prepared by a special method, the method for treating clay materials to prepare such a super-active catalyst and low temperature catalytic conversion of organic materials therewith.

2. Discussion of Prior Art

The activation of naturally-occurring and/or synthetic clay-type materials by mineral acid washing or by thermal decomposition of the ammonium-exchanged form of said clay to prepare catalysts for high temperature reactions conducted at over 400° C. is known in the art (Chem. Rev., 385–399, 74, 1974). These materials were among the first of the cracking catalysts. They are most effective when largely in their hydrogen form with reaction temperatures in the range of 400° C. to 500° C.

Activation of aluminosilicate zeolites by ion-exchange with ions such as rare earth and hydrogen for use in high temperature hydrocarbon conversion reactions is also known in the art.

By the present method, a clay material, existing in the raw state as found in nature or as synthesized, without having been heated to a temperature exceeding about 100° C., is ion-exchanged with transition metal ions, hydrogen ions, aluminum ions, ions of metals from Group IIB of the Periodic Table or a combination thereof at a temperature not exceeding about 100° C. and the resulting exchanged clay material is exposed to a temperature of at least about 50° C. but not exceeding about 250° C. This is believed novel, whereby high temperatures are avoided before, during and after ion exchange of the clay.

Catalytic cracking methods of the type to which this invention pertains are well known in the art. However, these methods over a clay catalyst at low temperature, e.g. 50° C. to 250° C., have not been reported to produce significant conversions of charge stock. For instance, greater than 0.5 weight percent conversion in catalytic cracking of a hydrocarbon over a clay catalyst at lower than 400° C. has not been reported.

Other catalytic conversion methods of the type to which this invention pertains are also well known in the art. These methods, however, over a clay catalyst which has been heated to a temperature substantially above about 250° C. will not produce as significant conversions of charge stock at low reaction temperatures of about 50° C. to 250° C. as the superactive clay material catalyst of this invention.

References showing the state of the art as related to the present invention include U.S. Pat. No. 2,480,627, which teaches reactivating used (and therefore heated to temperatures over 400° C.) clay catalysts, by introducing an alkali metal into said used clay and then base exchanging the alkali metal so introduced into said used clay with various other metals. The catalyst so reactivated is then taught to be effective in a high temperature (427° C.) catalytic conversion of gas oil. Other references showing the state of the related art but which fall short of teaching the present improved method and catalytic conversion processes include U.S. Pat. Nos. 3,515,679; 3,278,417; 2,982,717; 2,848,423; 2,825,699; 2,727,868; 2,862,874 and 2,744,057 and Great Britain Pat. Nos. 847,528 and 1,085,758.

SUMMARY OF THE INVENTION

This invention contemplates a super-active clay material catalyst and the special method for preparing same for use in low temperature organic compound cracking, low temperature heavy crude petroleum stock viscosity lowering and low temperature decomposing of kerogen. Other reactions, such as defunctionalization (removal of heteroatomic groupings), cyclization, isomerization, hydrogen disproportionation, esterification, hydration, etc. are also contemplated with said super-active clay material as catalyst. The lack of severe catalyst preparation conditions, the ease of treatment and the mild catalytic conversion conditions make the subject of the present invention highly desirable from an economic and engineering view point.

DESCRIPTION OF SPECIFIC EMBODIMENTS

Clay materials for use in the improved treatment of the present invention include compositions composed primarily of clay minerals identified as hydrated aluminum silicates having the general formula $Al_2O_3 \cdot xSiO_2 \cdot yH_2O$ wherein x is an integer of from about 0.5 to about 600 and y, depending upon the state of hydration of the clay mineral, is from about 1 to about 300, and wherein said hydrated aluminum silicate clay mineral may have associated therewith, for example, one or more metals or metal oxides selected from the group consisting of Group IA, IIA and VIII of the Periodic Table of Elements. Non-limiting examples of such hydrated aluminum silicate-minerals which comprise the major proportion of clays for use in the present improved treatment include:

kaolinite ($Al_2O_3 \cdot 2SiO_2 \cdot nH_2O$),
halloysite ($Al_2O_3 \cdot 3SiO_2 \cdot nH_2O$),
attapulgite (($Mg, Al)_5Si_8O_{22}(OH)_4 \cdot nH_2O$),
montmorillonite (($Mg, Ca)O \cdot Al_2O_3 \cdot 5SiO_2 \cdot nH_2O$),
illite ($K_2O$, $MgO$, $Al_2O_3$, $SiO_2$, $H_2O$; all in variable amounts),
and
vermiculite ($22MgO \cdot 5Al_2O_3 \cdot Fe_2O_3 \cdot 22SiO_2 \cdot nH_2O$).

The quantity n in the above general formulas depends upon the degree of hydration of the particular clay mineral and will most often be between about 1 and about 300. Since the clay mineral for use herein must not be heated to a temperature exceeding 100° C. prior to or during ion exchange, n will seldom be below about 1.

Non-limiting examples of clays for use in the present improved treatment include:

fuller's earth—a clay material having high natural adsorptive powers which is usually composed largely of the clay mineral attapulgite with some montmorillonite, kaolin—a clay material being mainly constituted of the mineral kaolinite, and bentonite—a clay containing appreciable amounts of the clay mineral montmorillonite and usually having some magnesium and iron associated therewith.

The clay material for treatment hereby must be in the raw state as found in nature or as synthesized and must not have been heated to a temperature exceeding about 100° C. prior to ion-exchange with the herein listed cations. Ion exchange of the clay material may be conducted by means well known in the art so long as the temperature of the clay during said exchange does not exceed about 100° C. Typical ion-exchange techniques include contacting the clay material (which is in the raw state and which has not been heated to a temperature exceeding 100° C.) with a salt solution of the desired cation or cations. Although a wide variety of salt solutions may be employed, preference is given to chlorides, nitrates and sulfates.

During the contacting of the clay material with the salt solution the temperature must be maintained at less than about 100° C. and following said contacting the clay material is preferably washed with water and dried at a temperature not exceeding about 250° C. The exchanged clay material may be heated to a temperature of between about 50° C. and about 250° C. in an atmosphere of, for example, air, nitrogen, hydrogen and carbon dioxide, or in the presence of an organic material, e.g. heavy crude petroleum stock, to be catalytically converted. It is critical that no calcination of the exchanged clay material at higher temperatures take place.

The cations useful for exchange into the clay material hereby include aluminum ions, hydrogen ions, ions of metals from Group IIB of the Periodic Table, transition metal ions and combinations thereof. By transition metal ions it is meant the cations of elements in which the filling of the outermost shell to 8 electrons within a period is interrupted to bring the penultimate shell from 8 to 18 or 32 electrons. These elements can use penultimate shell orbitals as well as outermost shell orbitals in bonding. Transition metal elements include those having atomic numbers of from 21 to 29, from 39 to 47, from 57 to 79 and from 89 on, inclusive. Those having atomic numbers of from 57 to 71, inclusive, are located in Group IIIB of the Periodic Table of Elements and are commonly named rare earth elements.

When the present method of treatment for the clay material is followed, a super-active clay catalyst is the result. For catalytic conversion of an organic material, in general, with the presently prepared super-active clay material as catalyst, reaction conditions may be maintained at a temperature of between about 50° C. and about 250° C., a pressure of between about 0 psig and about 20,000 psig, a weight hourly space velocity (WHSV) of between about 0.001 $hr^{-1}$ and about 50 $hr^{-1}$. When said conversion is to be conducted in a source location, i.e. in situ, a contact time of from about 5 minutes to about 20 years may be maintained.

Said clay catalyst is useful for cracking organic compounds at mild reaction conditions including a low temperature of from about 150° C. to about 250° C., and preferably of from about 180° C. to about 220° C., a pressure of from about 0 psig to about 500 psig, and preferably of from about 0 psig to about 100 psig, a WHSV of from about 0.001 $hr^{-1}$ to about 20 $hr^{-1}$, and preferably of from about 0.01 $hr^{-1}$ to about 1 $hr^{-1}$ and in the presence or absence of added hydrogen.

Non-limiting examples of organic compounds which may be cracked according to the present process include hydrocarbons such as, for example, paraffinic, naphthenic and aromatic hydrocarbons and those having structures with paraffinic, naphthenic and/or aromatic components; carboxylic acids; amines; alcohols; ketones; aldehydes; waxes and lipids.

The present super-active clay catalyst is also useful for reducing the viscosity of heavy crude petroleum stocks at mild reaction conditions including a low temperature of from about 50° C. to about 250° C., and preferably of from about 150° C. to about 200° C., a pressure of from about 0 psig to about 20,000 psig (since geopressures in formations of interest range from 0 psig to about 20,000 psig and this procedure may be accomplished in a well), and preferably of from about 0 psig to about 1000 psig, a WHSV of from about 0.001 $hr^{-1}$ to about 50 $hr^{-1}$, and preferably of from about 0.1 $hr^{-1}$ to about 5 $hr^{-1}$ and in the presence or absence of added hydrogen. When this conversion is to be conducted in a geologic formation, i.e. in situ, a contact time of from about 5 minutes to about 20 years should be maintained.

Non-limiting examples of heavy crude petroleum stocks which may be reduced in viscosity according to the present process include Celtic crude, Venezuelan crude, naphthenic and waxy crudes and crudes as extracted from tar sands or oil shales.

The super-active clay catalyst produced by the method of this invention is also useful for decomposing kerogen at mild reaction conditions including low temperature of from about 50° C. to about 250° C., and preferably of from about 150° C. to about 200° C., a pressure of from about 0 psig to about 20,000 psig, and preferably of from about 0 psig to about 1000 psig, a contact time of from about 5 minutes to about 10 years and in the presence or absence of added hydrogen.

Kerogen is the organic matter which is found in many sediments and sedimentary rocks, e.g. oil shales, and which is insoluble in common organic solvents such as, for example, benzene and chloroform. It is supposed that at least some portion of petroleum is formed from kerogen. Some skilled art workers believe that kerogen is the immediate precursor to petroleum oil. It is believed that kerogen contains highly strained or activated bonds and is not a definite compound but a complex mixture of various complex compounds that vary from one sediment or sedimentary rock location to another.

The super-active clay catalyst material of this invention may be used to upgrade, convert, render less viscous and aid in the production of petroleum in the earth, i.e. in situ. It has been found that the super-active clay catalyst material is effective under geologic conditions (i.e. relatively low temperature, in the presence of water, etc.), and is capable of converting kerogen to petroleum like products. It has also been found that the super-active clay catalyst material mediates various organic conversions which are necessary for the formation and upgrading of petroleum.

Most of the sediments and earth strata which contain kerogen, protopetroleum, bitumen, heavy oils, etc. also contain one or more of the above-identified clay minerals. These minerals in their natural state under the surface of the earth are often in intimate contact with organic material (e.g. organic rich shales, marls, etc.). Many of the naturally occurring limestones, cherts, sandstones, etc. are also known or expected to contain said clay minerals. Thus, naturally occurring minerals present in the geosphere are available, in situ, for catalytic conversion of sedimentary organic materials. By transformation of said clay minerals, in situ, to super-active clay catalyst material as described herein, it is possible to greatly accelerate organic conversion under geologic conditions in time periods measured in weeks or months rather than thousands of years which would be required in the absence of said clay catalyst material. One procedure for performing in situ organic material conversion reactions in sediments involves in situ activation of naturally occurring clay minerals in the formation. This may be accomplished by introducing into a particular geologic formation material capable of converting the naturally occurring clay minerals to super-active clay catalyst material as disclosed herein. Once activated, the super-active clay catalyst material will mediate the beneficial organic conversions under existing geologic conditions.

The transformation of clay minerals present in the earth strata to said super-active clay catalyst material can be accomplished in a number of ways so long as the temperature requirements herein taught are realized. For example, solutions of the various cations desired for exchange are introduced into an earth formation containing a clay mineral. The ion exchange reaction will then occur in the earth strata. In another example, the addition of acidic gases or materials capable of reacting with the natural formation water to render them acidic can be employed to provide hydrogen ions and other desirable ions from existing sediment (e.g. Al, Fe, etc.) for the desired clay catalyst activation.

In order to accelerate the chemical conversion under existing geologic conditions once the super-active clay catalyst material has been prepared in situ or transported thereto, the temperature of the strata can be increased by, for example, injecting hot gases, steam, "fire flooding", etc. Of course, the temperature at the site of the catalytic reaction should not substantially exceed 250° C. in order to maintain the catalytic activity of the super-active clay catalyst material. This does not mean that such low temperatures must be maintained at all places in the formation. For example, in one application, the clay minerals of the formation are transformed to super-active clay catalyst material by an in situ method. Thereafter a "fire flooding" technique is used to heat the remaining formation and to drive product toward a production well. At the combustion front, high temperature may lower the activity of the super-active clay catalyst material, but destructively high temperature will not be experienced by said catalyst material in the remainder of the formation. As "fire flooding" advances, the temperature of the formation increases resulting in increased reaction rate. Desirable reaction products are driven toward the production well, leaving undesirable carbonaceous matter on the spent catalyst material and the formation rock. This carbonaceous matter serves as "fuel" for maintaining the "fire flood". In another application, the clay minerals present in the formation are activated as described and the desired chemical reactions are allowed to proceed under the naturally occurring geologic conditions. After several years, the converted or upgraded organic materials are produced by any number of production techniques, i.e. primary, secondary or tertiary recovery processes. Still another application involves the introduction of the super-active clay catalyst material into a formation, strata, tar sand sediment or the like where it will catalyze the desired reaction. After introduction of said catalyst material into the formation, strata, tar sand sediment, etc., the upgrading, etc., can be performed by the methods above described.

The following examples demonstrate the present invention and are not to be considered limiting in any way.

EXAMPLE 1

About 25 grams of powdered raw bentonite clay which has not been heated to a temperature exceeding 100° C. and with an exchange capacity of 0.9 meq/gram was contacted with a liter of 1 N HCl solution at room temperature and atmospheric pressure for 30 minutes to form a hydrogen ion exchanged bentonite clay. The exchanged clay was collected by centrifugation and washed with distilled water. Centrifugation and washing with distilled water were repeated until the water was free from chloride ions as indicated by a AgCl test.

EXAMPLE 2

An aluminum ion exchanged bentonite clay was prepared as in Example 1 by using a $AlCl_3.6H_2O$ solution of about 5 N in place of the HCl solution.

EXAMPLE 3

A thorium ion exchanged bentonite clay was prepared as in Example 1 by using a hydrated $ThCl_4$ solution of about 5 N in place of the HCl solution.

EXAMPLE 4

A cadmium ion exchanged bentonite clay was prepared as in Example 1 using a $CdCl_2.2\frac{1}{2}H_2O$ solution of about 5 N in place of the HCl solution.

EXAMPLE 5

A cobalt ion exchanged bentonite clay was prepared as in Example 1 using a concentrated $CoCl_2.6H_2O$ solution in place of the HCl solution.

EXAMPLE 6

An iron ion exchanged bentonite clay was prepared as in Example 1 using a concentrated $Fe(NO_3)_3.9H_2O$ solution in place of the HCl solution.

EXAMPLE 7

A nickel ion exchanged bentonite clay was prepared as in Example 1 using a concentrated $NiCl_2.6H_2O$ solution in place of the HCl solution.

EXAMPLE 8

A copper ion exchanged bentonite clay was prepared as in Example 1 using a concentrated $CuCl_2.2H_2O$ solution in place of the HCl solution.

EXAMPLE 9

Another hydrogen ion exchanged bentonite clay was prepared by contacting a 25 gram quantity of powdered raw Wyoming bentonite which had not been heated to a temperature exceeding 100° C. with 4 bed volumes of 1 N HCl solution at room temperature and atmospheric pressure. The powdered raw bentonite was wet packed into a glass chromatograph column for contacting with the HCl solution. After contact with the HCl solution, the clay was transferred to a buchner funnel, placed under vacuum to remove excess liquid and then air dried overnight at room temperature.

EXAMPLES 10–22

In order to demonstrate the significant benefit of the present improved method for treatment of clay materials, a low temperature hydrocarbon compound cracking reaction was performed over a narrow range of low temperatures with the clay materials prepared in Examples 1 and 9 as the catalyst. Also, for comparison purposes, several other known cracking catalyst materials as well as a portion of the clay material prepared in Example 1 which had thereafter been heated to a temperature exceeding 250° C. for one hour were used as the catalyst. The reaction vessel consisted of a quartz or pyrex micro reactor tube. The micro reactor, charge pumping equipment and temperature controller were of standard design. The reaction procedure consisted of pumping the charge stock (at a constant rate) over the catalyst. The catalyst bed was maintained at constant temperature by use of an annular heater equipped with a device to sense and control the temperature of the catalyst bed. The products were analyzed by chromatographic techniques. In each reaction, the pressure was maintained at 0 psig without use of added hydrogen. Other reaction conditions and results are listed in Table 1.

TABLE 1

Low Temperature Cracking Reactions of Examples 10-22

| Example | Catalyst | Hydrocarbon Charge Stock | Temperature, °C. | WHSV | Conversion, Wt. % |
|---|---|---|---|---|---|
| 10 | Example 1 | n-hexadecane | 203 | 0.1 | 41.6 |
| 11 | Example 1 | n-hexadecane | 170 | 1.0 | 2.5 |
| 12 | Example 1 | n-hexadecane | 200 | 1.0 | 5.0 |
| 13 | Example 1 | n-hexadecane | 218 | 1.0 | 7.0 |
| 14 | Example 1 | n-hexylcyclohexane | 180 | 1.0 | 27.0 |
| 15 | Example 1 | n-hexadecane | 150-152 | 0.1 | 1.5 |
| 16 | Example 9 | n-hexadecane | 160 | 1.0 | 0.4 |
| 17 | Example 9 | n-hexadecane | 188 | 1.0 | 2.8 |
| 18 | Portion of Example 1 material which was thereafter heated to 500° C. for one hour | n-hexadecane | 200 | 1.0 | nil |
| 19 | Portion of Example 1 material which was thereafter heated to 500° C. for one hour | n-hexadecane | 200 | 0.3 | nil |
| 20 | Sodium bentonite | n-hexadecane | 200 | 0.35 | nil |
| 21 | Raw bentonite | n-hexadecane | 200 | 0.35 | nil |
| 22 | Commercial silica alumina cracking catalyst | n-hexadecane | 218 | 0.35 | nil |

An interesting phenomenon observed during the above experiments was that the products of the present low temperature cracking of n-hexadecane process provided products chiefly composed of branched paraffins in the gasoline-kerosine boiling range. For instance, the present low temperature cracking process over a clay catalyst prepared as in Example 1 may provide product from a n-hexadecane charge stock having an iso-$C_4$: n-$C_4$ ratio of over 5, such as, for example, about 5.6, and an iso-$C_5$: n-$C_5$ ratio of over 7, such as, for example, about 7.8.

EXAMPLE 23

A sample of heavy crude petroleum stock, designated Celtic crude, was passed over a bed of 60–80 mesh clay material prepared as in Example 8 at a contact temperature of only 175° C. and 197° C., a WHSV of 1.2 and a pressure of 0 psig. The viscosity of the starting, uncontacted crude and the contacted crude was measured at 25° C. using a Brookfield viscometer. Relative viscosities are listed in Table 2.

Table 2

| Sample | Relative Viscosity | Bed Volumes Crude | Temperature, °C. |
|---|---|---|---|
| untreated crude | 1 | 0 | — |
| 1 | 0.80 | 1 | 175 |
| 2 | 1 | 1 | 175 |
| 3 | 0.67 | 2 | 197 |
| 4 | 0.86 | 1 | 197 |
| 5 | 0.80 | 1 | 197 |
| 6 | 0.72 | 1 | 197 |
| 7 | 0.85 | 1 | 197 |

EXAMPLE 24

A sample of "mineral free" kerogen having the following composition:

| Component | Wt. % |
|---|---|
| C | 70.8 |
| H | 8.0 |
| O | 8.0 |
| S | 7.6 |
| N | 0.9 |
| ash | 3.0 | was isolated from sediments collected from the Todilto formation (Jurassic-New Mexico). The kerogen was heated at temperatures between 100° and 200° C. with and without contact with a clay material prepared as in Example 1. The effect of adding a catalyst to the kerogen was studied in "batch reactions" and by a thermogravimetric (TGA) technique.

In the TGA experiments, clay, kerogen, and clay intimately mixed with kerogen were heated (under a helium atmosphere) to constant weight at 100° C., and the change in weight on further heating to 200° C. at 2°/min. monitored with time. The results are summarized in Table 3, hereinafter presented.

All of the samples lost weight on heating. In the case of the clay, the decrease in weight is due to removal of sorbed water. When the mineral free kerogen was heated, the weight decrease resulted mainly from loss of volatile organic compounds. But the large weight loss observed on heating the kerogen-clay mixture is greater than can be accounted for by the additive weight loss on heating the individual components. From the data (Table 3) it is estimated that the kerogen will yield about 1.6-2 times as much volatile products when mixed with a clay material catalyst made according to the present improved method than when heated alone.

A similar result was obtained in the "batch" experiments. Here, equal amounts of kerogen were heated with and without contact with a clay material prepared as in Example 1 under the conditions listed in Table 3. At the end of the reaction period, the pentane soluble components of the reaction mixture were extracted and analyzed by gas chromatography on a "boiling point" column. It was observed that the clay mediated reaction produced significantly more compounds boiling below n-$C_{11}$ (kerosine-gasoline range) than did the clay free system. Further, it appeared that some of the lower molecular weight materials were formed at the expense of compounds boiling above n-$C_{18}$.

More particularly, the batch reactions were performed under a nitrogen atmosphere in flasks fitted with water-cooled condensers and manometers. In these reactions 0.4 gram of kerogen and 0.4 gram of kerogen intimately mixed with 2.0 grams of the clay material were heated at 175° C. for 24 hours. Less than 5 cc. of gases were evolved in either reaction. At the end of the reaction period, the reactors were cooled, and n-pentane (about 50 cc.) was used to wash the reactors and their contents. The pentane extracts were concentrated, adjusted to the same volume (5 cc.) and the concentrates gas chromatographed using a 15% Dexsil column for separation of components according to boiling point. There appeared to be about 1.4 times of much material in the pentane extract from the clay-kerogen reactions as in the reactions without clay.

The TGA experiments were performed in a helium atmosphere, using a Dupont Thermogravimetric analyzer. The kerogen-clay mixture was prepared by thoroughly mixing 0.415 gram of Todilto kerogen with 2.0 grams of the clay material in a water slurry followed by removal of the water by vacuum filtration. The kerogen and clay samples were slurried in water and recovered by filtration in a similar way. The air dried samples were spread on watch glasses and stored in a closed glass jar for several days before use in order to establish moisture equilibrium among them. The following protocol was followed in the TGA runs: samples were heated in helium from room temperature to 100° C. at 10° C. per min., maintained at 100° C. for 30 min., and the weight change on heating from 100° C. to 200° C. at 2° per min. measured.

Table 3
Summary of the TGA Experiment of Example 24

| Sample | wt. at 100° C. (mg) | wt. at 200° C. (mg) | weight change (mg) |
|---|---|---|---|
| (1) kerogen-clay catalyst** (17.2 wt%-82.8 wt%) | 28.15 | 27.50 | −0.65 |
| (2) mineral free kerogen | 7.28 | 6.96 | −0.32 |
| (3) clay catalyst | 42.20 | 41.85 | −0.35 |

**Predicted weight loss for kerogen-clay catalyst mixture assuming no interaction between kerogen and clay:

(a) clay component, $\frac{28.15}{42.20}$ (0.838) (0.35) mg = 0.193 mg.

(b) kerogen component, $\frac{28.15}{7.28}$ (0.172) (0.32) mg = 0.213 mg.

wt loss, $\frac{observed}{predicted} = \frac{0.65}{(a) + (b)} = \frac{0.65}{0.406} = 1.6$ $\frac{observed\ loss}{predicted\ loss\ (kerogen)} = \frac{(clay\ catalyst + kerogen) - (clay\ catalyst)}{predicted\ loss\ (kerogen)} = 2.1$

EXAMPLE 25

A solution of 2 grams of the organic compound citral in 100 ml of ethylene chloride is placed in a 250 ml round bottom flask equipped with a reflux condenser and stirrer. The flask is heated to 80° C. and, while stirring, 10 grams of powdered thorium ion exchanged bentonite clay prepared as in Example 3 is added thereto. After two weeks at 80° C. with stirring, over 20 weight percent conversion of the citral to p-cymene is observed. The reaction of this example involves the steps of cyclization and defunctionalization (removal of an oxygen heteroatom) among others.

EXAMPLE 26

A solution of 2 grams of the organic compound citral in 100 ml of dioxane is placed in a 250 ml round bottom flask equipped with a reflux condenser and stirrer. The flask is heated to 100° C. and, while stirring, 10 grams of powdered aluminum ion exchanged bentonite clay prepared as in Example 2 is added thereto. After two weeks at 100° C. with stirring, over 20 weight percent conversion of the citral to p-cymeme is observed. The reaction of this example involves the steps of cyclization and defunctionalization (removal of an oxygen heteroatom) among others.

EXAMPLES 27-31

In each of five experiments, ten cc of t-butylacetate was added to a 50 cc, three-necked round bottom flask equipped with a stirrer, a reflux condenser and a device for measuring the rate of isobutylene evolution. Each flask was heated to reflux (about 98°-100° C.) with stirring and 100 mg of catalyst material, each defined below, was added to each flask along with an additional 5 cc of t-butylacetate. As soon as each flask again reached reflux temperature, the rate of isobutylene production was measured in terms of quantity (cc) of isobutylene produced per minute per gram of catalyst material. The results of these experiments are presented in Table 4, hereinafter presented. Said results clearly establish the superiority of the present super-active clay catalyst when compared with other clay catalyst materials. This is evident from comparison of the results obtained for Examples 27-29 (present catalyst) with results obtained from Examples 30-31 (clay materials having been heated to greater than 250° C.).

The catalyst material for Example 27 was an aluminum ion exchanged bentonite clay prepared as in Example 2. The catalyst material for Example 28 was a hydrogen ion exchanged montmorillonite clay prepared as in Example 1. The catalyst material for Example 29 was a thorium ion exchanged bentonite clay prepared as in Example 3. The catalyst material for Example 30 was an aluminum ion exchanged bentonite clay prepared as in Example 2, but thereafter heated to 400° C. for 1 hour prior to insertion into the flask. The catalyst material for Example 31 was an aluminum ion exchanged bentonite clay prepared as in Example 2, but thereafter heated to 500° C. for 1 hour prior to insertion into the flask.

TABLE 4

Results of Examples 27-31

| Example | Rate of Isobutylene Production (cc isobutylene produced/minute/gram of catalyst) |
|---|---|
| 27 | 30,000 |
| 28 | 23,000 |

TABLE 4-continued

Results of Examples 27-31

| Example | Rate of Isobutylene Production (cc isobutylene produced/ minute/gram of catalyst) |
|---|---|
| 29 | 11,000 |
| 30 | 100 |
| 31 | ~25 |

EXAMPLE 32

A 50 mg quantity of $\beta$-methylcinnamic acid in 25 ml of dioxane solvent was heated at 100° C. in a 100 ml round bottom flask equipped with a stirrer, reflux condenser and a device for sampling reaction products. In the absence of catalyst, no reaction was observed. When 1 gram of aluminum ion exchanged smectite clay prepared as in Example 2 was added to the flask, a decarboxylation reaction with a first order rate of $2.2 \times 10^{-5}$ sec$^{-1}$ (per gram of catalyst) was observed. Analysis of the reaction product by gas chromatography indicated the presence of $CO_2$ and methylstyrene as primary components. The reaction of this example involved decarboxylation of an unsaturated carboxylic acid.

EXAMPLE 33

The method of Example 32 was also conducted successfully with water as the solvent in place of the dioxane.

EXAMPLE 34

A solution containing 0.5 gram of abietic acid in 50 ml of dioxane solvent was heated at 80° C. with 5 grams of hydrogen ion exchanged bentonite clay prepared as in Example 1 for 12 days under an atmosphere of carbon dioxide. Over 4 weight percent conversion of the abietic acid was observed to a yellow, fluorescent reaction product. Said product was chromatographed over alumina and silica gel to give a hydrocarbon fraction possessing UV and IR spectra characteristic of polynuclear aromatic hydrocarbons of the phenanthrene type (IR bands at 815 and 750 cm$^{-1}$ in a ratio of 1:3.5; UV-$\lambda$ max 247, 295, 340 nm). The reaction of this example involved the steps of defunctionalization, alkyl migration and hydrogen disproportionation among others.

What is claimed is:

1. In a method for treating a clay material which comprises contacting said clay mateial located under the surface of the earth with solution containing cations selected from the group consisting of transition metal ions, hydrogen ions, aluminum ions, ions of metals from Group IIB of the Periodic Table of Elements and a combination thereof with each other to effect ion exchange of said clay material with said ions, the improvement comprising using a clay material in the raw state as found in nature or as synthesized which has not been exposed to a temperature exceeding about 100° C. prior to and during said contact with said solution and thereafter exposing said exchanged clay material to a temperature of at least about 50° C. but not exceeding about 250° C.

2. The method of claim 1 wherein said clay material is selected from the group consisting of fuller's earth, kaolin and bentonite.

3. The method of claim 1 wherein said clay material is composed primarily of clay minerals selected from the group consisting of kaolinite, halloysite, attapulgite, montmorillonite, illite and vermiculite.

4. A method for catalytic conversion of organic material which comprises contacting said organic material with an ion-exchanged clay material formed of a clay material in the raw state as found in nature or as synthesized, said clay material having been treated with a solution containing cations selected from the group consisting of transition metal ions, hydrogen ions, aluminum ions, ions of metals from Group IIB of the Periodic Table of Elements and mixtures thereof to effect an ion exchange of said clay material, said clay material having been exposed to a temperature not exceeding 100° C. prior to or during said treatment with said solution, said clay material after treatment with said solution having been exposed to a temperature within the range of about 50° C. to 250° C., at a low temperature from about 50° C. to about 250° C., a pressure of from about 0 psig to about 20,000 psig, and a weight hourly space velocity from about 0.001 hr$^{-1}$ to about 50 hr$^{-1}$.

5. The method of claim 4 wherein said organic material is a hydrocarbon compound.

6. The method of claim 4 wherein said clay material in the raw state is selected from the group consisting of fuller's earth, kaolin and bentonite.

7. The method of claim 4 wherein said clay material in the raw state is selected from the group consisting of kaolonite, halloysite, attapulgite, montmorillonite, illite, and vermiculite.

8. A method for reducing the viscosity of heavy crude petroleum stock at a low temperature which comprises contacting heavy crude peteoleum stock with an ion-exchanged clay material formed of a clay material in the raw state as found in nature or as synthesized, said clay material having been treated with a solution containing cations selected from the group consisting of transition metal ions, hydrogen ions, aluminum ions, ions of metals from Group IIB of the Periodic Table of Elements and mixtures thereof to effect an ion exchange of said clay material, said clay material having been exposed to a temperature not exceeding 100° C. prior to or during said treatment with said solution, said clay material after treatment with said solution having been exposed to a temperature within the range of about 50° C. to 250° C., at a low temperature from about 50° C. to about 250° C., a pressure of from about 0 psig to about 20,000 psig and a weight hourly space velocity from about 0.001 to about 50.

9. The method of claim 8 wherein said contacting is at a temperature of from about 150° C. to about 200° C., a pressure of from about 0 psig to about 1000 psig and a WHSV of from about 0.1 to about 5.

10. The method of claim 8 wherein said clay material in the raw state is selected from the group consisting of fuller's earth, kaolin and bentonite.

11. The method of claim 8 wherein said clay material in the raw state is composed primarily of clay minerals selected from the group consisting of kaolonite, halloysite, attapulgite, montmorillonite, illite, and vermiculite.

12. A method for reducing the viscosity of heavy crude petroleum stock in a formation which comprises contacting said petroleum stock with an ion-exchanged clay material formed of a clay material in the raw state as found in nature or as synthesized, said clay material having been treated with a solution containing cations selected from the group consisting of transition metal ions, hydrogen ions, aluminum ions, ions of metals from Group IIB of the Periodic Table of Elements and mixtures thereof to effect an ion exchange of said clay material, said clay material having been exposed to a temperature not exceeding 100° C. prior to or during said treatment with said solution, said clay material after treatment with said solution having been exposed to a temperature within the range of about 50° C. to 250° C., having been transported into said formation, said contacting at a temperature of from about 50° C. to about 250° C., a pressure of from about 0 psig to about 20,000 psig and a contact time of from about 5 minutes to about 20 years.

13. The method of claim 12 wherein said clay material in the raw state is a clay material selected from the group consisting of fuller's earth, kaolin and bentonite.

14. The method of claim 12 wherein said clay material in the raw state is a clay material composed primarily of clay minerals selected from the group consisting of kaolonite, halloysite, attapulgite, montmorillonite, illite, and vermiculite.

15. A method for decomposing kerogen at low temperature which comprises contacting said kerogen with an ion-exchanged clay material formed of a clay material in the raw state as found in nature or as synthesized, said clay material having been treated with a solution containing cations selected from the group consisting of transition metal ions, hydrogen ions, aluminum ions, ions of metals from Group IIB of the Periodic Table of Elements and mixtures thereof to effect an ion exchange of said clay material, said clay material having been exposed to a temperature not exceeding 100° C. prior to or during said treatment with said solution, said clay material after treatment with said solution having been exposed to a temperature within the range of about 50° C. to 250° C., at a low temperature from about 50° C. to about 250° C., a pressure of from about 0 psig to about 20,000 psig and a contact time of from about 5 minutes to about 10 years.

16. The method of claim 15 wherein said contacting is at a temperature of from about 150° C. to about 200° C. and a pressure of from about 0 psig to about 1000 psig.

17. The method of claim 15 wherein said clay material in the raw state is a clay material selected from the group consisting of fuller's earth, kaolin and bentonite.

18. The method of claim 15 wherein said clay material in the raw state is a clay material composed primarily of clay minerals selected from the group consisting of kaolonite, halloysite, attapulgite, montmorillonite, illite, and vermiculite.

19. An ion-exchanged clay material formed of a clay material in the raw state as found in nature or as synthesized, said clay material having been treated while located under the surface of the earth by contacting with a solution containing cations selected from the group consisting of transition metal ions, hydrogen ions, aluminum ions, ions of metals from Group IIB of the Periodic Table of Elements and mixtures thereof to effect an ion exchange of said clay material, said clay material having been exposed to a temperature not exceeding 100° C. prior to or during said treatment with said solution, said clay material after treatment with said solution having been exposed to a temperature within the range of about 50° C. to 250° C.

20. The ion-exchanged clay material of claim 19 wherein said clay material is selected from the group consisting of fuller's earth, kaolin and bentonite.

21. The ion-exchanged clay material of claim 19 wherein said clay material is composed primarily of clay minerals selected from the group consisting of kaolonite, halloysite, attapulgite, montmorillonite, illite, and vermiculite.

22. The method of claim 7 wherein said clay material is that as defined by claim 19.

* * * * *